United States Patent
Palumbo et al.

(10) Patent No.: US 11,457,020 B2
(45) Date of Patent: Sep. 27, 2022

(54) METHOD FOR INTEGRITY PROTECTION IN A COMPUTER NETWORK

(71) Applicant: F-SECURE CORPORATION, Helsinki (FI)

(72) Inventors: Paolo Palumbo, Helsinki (FI); Alexey Kirichenko, Helsinki (FI); Valtteri Niemi, Helsinki (FI); Sara Ramezanian, Helsinki (FI); Tommi Meskanen, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 210 days.

(21) Appl. No.: 16/878,312

(22) Filed: May 19, 2020

(65) Prior Publication Data

US 2020/0374295 A1    Nov. 26, 2020

(30) Foreign Application Priority Data

May 24, 2019   (GB) ...................................... 1907310

(51) Int. Cl.
*H04L 9/40* (2022.01)
*H04L 9/32* (2006.01)

(52) U.S. Cl.
CPC .......... *H04L 63/123* (2013.01); *H04L 9/3213* (2013.01); *H04L 9/3236* (2013.01); *H04L 63/1441* (2013.01)

(58) Field of Classification Search
CPC ... H04L 63/123; H04L 9/3213; H04L 9/3236; H04L 63/1441; H04L 9/3234; H04L 63/1416; G06F 21/64; G06F 21/552; G06F 21/554

See application file for complete search history.

(56) References Cited

U.S. PATENT DOCUMENTS

| | | | | |
|---|---|---|---|---|
| 7,246,242 B1* | 7/2007 | Niemi | ................. | H04W 12/122 380/255 |
| 10,015,015 B1* | 7/2018 | Lazar | ..................... | H04L 9/3236 |
| 10,666,657 B1* | 5/2020 | Threlkeld | ............... | H04L 63/06 |
| 10,701,096 B1* | 6/2020 | Johnston | ................ | G06Q 10/20 |
| 2019/0012490 A1* | 1/2019 | Khatri | ..................... | G06F 21/79 |

(Continued)

OTHER PUBLICATIONS

Search Report for British Application No. GB1907310.5.

*Primary Examiner* — J. Brant Murphy
(74) *Attorney, Agent, or Firm* — Thomas | Horstemeyer, LLP (57) ABSTRACT

There is provided a method comprising: generating and sharing an initial value of an integrity token between an endpoint node and a security backend computer, collecting data at the endpoint node, wherein dissimilar data types are aligned as input events, generating a new integrity token every time a new input event is written to a local repository of the endpoint node, wherein the new integrity token is generated based on the new input event and a prior integrity token that was generated prior to the new integrity token, removing the prior integrity token generated prior to the new integrity token from the endpoint node each time a new integrity token has been generated, and sending one or more input events with the new integrity token to the security backend computer for enabling the security backend computer checking integrity of the data received from the endpoint.

17 Claims, 4 Drawing Sheets

(56) References Cited

U.S. PATENT DOCUMENTS

| | | | |
|---|---|---|---|
| 2019/0182222 A1* | 6/2019 | Sammet | H04L 9/3234 |
| 2020/0092722 A1* | 3/2020 | Hu | H04L 9/3226 |
| 2020/0153616 A1* | 5/2020 | Savalle | H04L 63/0428 |

* cited by examiner

Figure 1

S201 Generating and sharing an initial value of an integrity token, $T_0$, between endpoint node and security backend computer S202 Collecting and aligning raw data, wherein dissimilar data types are aligned as input events S203 Generating a new integrity token, $T_{i+1}$, every time a new input event, $E_{i+1}$, is written to a local repository of the endpoint node S204 Removing the prior integrity token, $T_i$, generated prior to the new integrity token, $T_{i+1}$ from the endpoint node when a new integrity token, $T_{i+1}$, has been generated S205 Sending one or more input events with the new integrity token, $T_{i+1}$, to the security backend computer for enabling the security backend computer checking integrity of the data received from the endpoint

Figure 2

S201 Generating and sharing an initial value of an integrity token, $T_0$, between endpoint node and security backend computer

S206 Receiving input events collected by endpoint node and a new integrity token, $T_{i+1}$, related to the input events, wherein the new integrity token, $T_{i+1}$, is generated every time a new input event, $E_{i+1}$, is written to a local repository of the endpoint node and wherein the new integrity token, $T_{i+1}$, is generated based on any new input event, $E_{i+1}$, and a prior integrity token, $T_i$, that was generated prior to the new integrity token, $T_{i+1}$

S207 Checking integrity of the received data on basis of a previously received integrity token related to the endpoint node, the received new integrity token, $T_{i+1}$ and the received one or more input events

METHOD FOR INTEGRITY PROTECTION IN A COMPUTER NETWORK

CROSS-REFERENCE TO RELATED APPLICATIONS

This application claims priority to, and the benefit of, British application no. 1907310.5, filed May 24, 2019, herein incorporated by reference in its entirety.

TECHNICAL FIELD

The present invention relates to a method for integrity protection in a computer network security system and to a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond. The growth of EDR has been made possible in part by the emergence of machine learning, big data and cloud computing.

EDR or other corresponding systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

It is typical that the collected data is stored in local repositories for certain periods of time and then it is periodically submitted to the service backend for further processing and analysis. For example, EDR often stores relevant recently-observed events, such as file and registry operations, networking activities, etc., in a local database and sends the data upstream in batches. The upstream sending logic usually depends on the endpoint network connectivity, service-specific parameters and observed events. Another example is services performing security-critical operations in the endpoint, such as software updates authenticity verification, which log information about operation types, parameters, objects, outcome and context, in particular, public keys and certificates used.

Since the endpoint environments cannot normally be trusted and since databases and logs containing sensitive data are natural targets for tampering by an attacker, mechanisms are needed for detecting unauthorized modifications made to data items in local repositories prior to their submission to service backends.

SUMMARY

According to first aspects of the invention there are provided methods for protecting integrity of data in a computer network as specified in claims 1 and 10.

According to other aspects of the invention, there is provided an endpoint node of a computer network server as specified in claim 15 and a security backend computer of a computer network as specified in claim 16.

According to further aspects of the invention, there is provided a computer program product comprising a computer storage medium having computer code stored thereon, which when executed on a computer system, causes the system to operate as a server according to the above second aspect of the invention.

DETAILED DESCRIPTION

Figure 1:
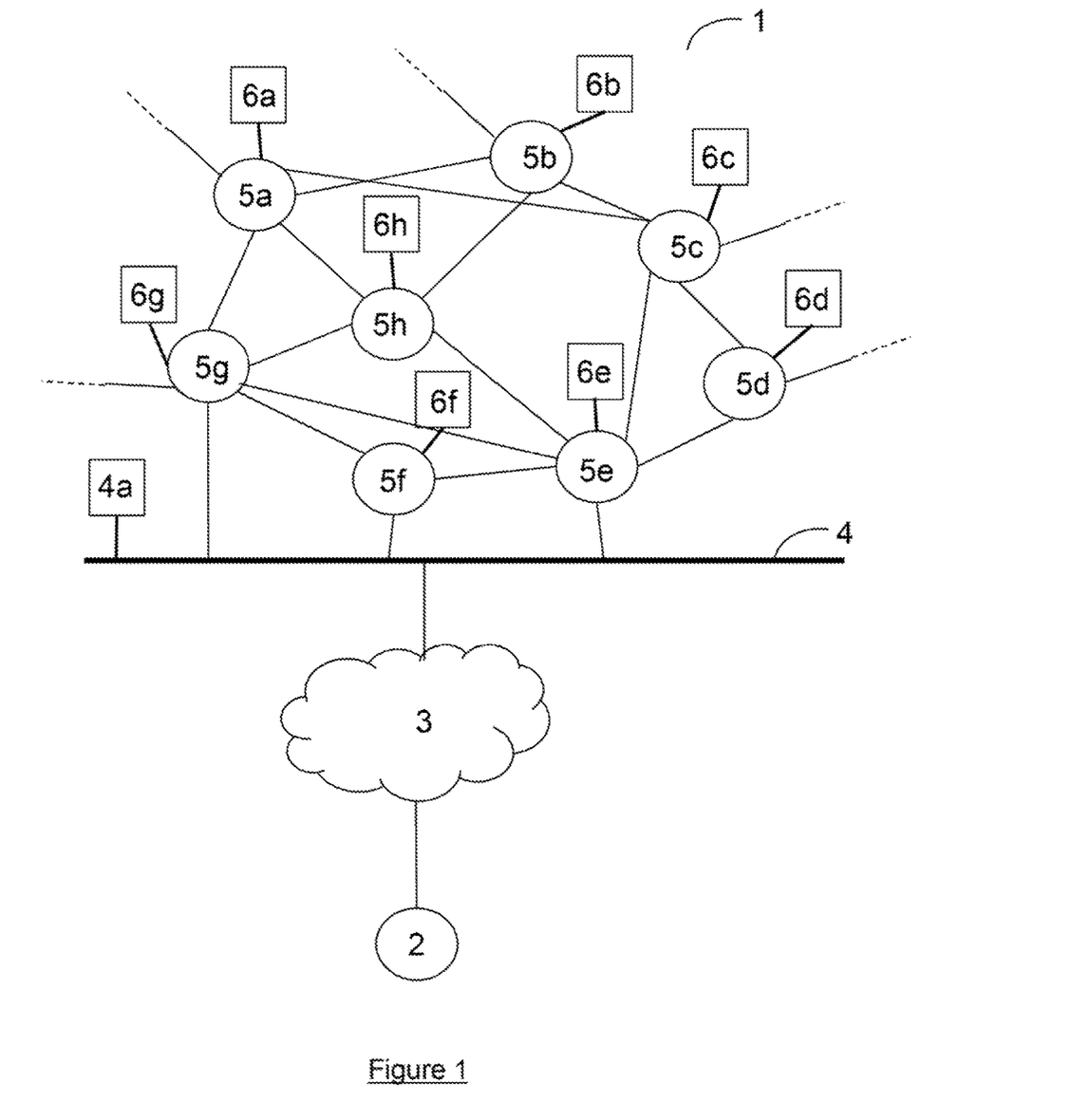
FIG. 1 illustrates schematically a network architecture.

FIG. 1 illustrates schematically a part of a first computer network 1 into which a computer system, for example an EDR system, has been installed. Also any other computer system that is able to implement the embodiments of the invention can be used instead or in addition to the EDR system used in this example. The first computer network is connected to an EDR backend 2 through the cloud 3. The EDR backend 2 forms a node on a second computer network relative to the first computer network. The second computer network is managed by an EDR system provider and may be separated from the cloud 3 by a gateway or other interface (not shown) or other network elements appropriate for an EDR backend 2. The first computer network 1 may also be separated from the cloud 3 by a gateway 4 or other interface. Other network structures are also envisaged.

The first computer network 1 is formed of a plurality of interconnected nodes 5*a*-5*g*, each representing an element in the computer network 1 such as a computer, smartphone, tablet, laptop, or other piece of network enabled hardware. Each node 5*a*-5*g* shown in the computer network also represents an EDR endpoint onto which a data collector (or "sensor") 6*a*-6*g* has been installed. Data collectors may also be installed on any other element of the computer network, such as on the gateway or other interface. A data collector 4*a* has been installed on the gateway 4 in FIG. 1. The data collectors, 6*a*-6*h*, 4*a* collect various types of data at the nodes 5*a*-5*h* or gateway 4 including, for example, program or file hashes, files stored at the nodes 5*a*-5*h*, logs of network traffic, process logs, binaries or files carved from memory (e.g. DLL, EXE, or memory forensics artefacts), and/or logs from monitoring actions executed by programs or scripts running on the nodes 5*a*-5*h* or gateway 4 (e.g. tcp dumps).

It is envisaged that any type of data which can assist in detecting and monitoring a security breach may be collected by the data collectors 6*a*-6*h*, 4*a* during their lifecycle and that the types of data which are observed and collected may be set according to rules defined by the EDR system provider upon installation of the EDR system or in response to instructions from the EDR backend 2. For example, the data collectors 6*a*-6*h*, 4*a* may collect data about the behaviour of programs running on an EDR endpoint and can observe when new programs are started. Where suitable resources are available, the collected data may be stored permanently or temporarily by the data collectors 6*a*-6*h*, 4*a* at their respective nodes or at a suitable storage location on the first computer network 1 (not shown).

The data collectors 6*a*-6*h*, 4*a* may also perform some simple, preliminary processing steps on the collected data but this is limited by the computing and network resources available at each node 5a-5h or gateway 4. One of the advantages of the data collectors 6a-6h, 4a is that they are configured to have a small footprint so that they do not disrupt normal functioning of the first computer network 1 through over use of bandwidth or computing power. As such, if the data collectors 6a-6h, 4a perform simple, preliminary processing steps on the collected data themselves, it should not disrupt normal functioning of the first computer network 1.

The data collectors 6a-6h, 4a are set up such that they may send information such as the data they have collected or send and receive instructions to/from the EDR backend 2 through the cloud 3. This allows the EDR system provider to remotely manage the EDR system without having to maintain a constant human presence at the organisation which administers the first computer network 1.

Attackers attempt modifying the data collected by services like EDR or software updates authenticity verification between the time of the first attacker operations in the endpoint and the time when the attacker is in control of the data collection and storing mechanism. It is assumed that some meaningful data are collected in that time interval. In particular, the attacker's goal may be to remove the traces indicating their presence and activities in the endpoint, which can be found from the data collected but not yet submitted to the backend. This is the kind of data that especially needs to be protected because all the information already submitted to the backend is essentially out of attacker's reach. In an embodiment, a method is thus proposed that can be used to detect unauthorized modification to such data in the backend.

Products and services that implement the EDR model, for example, are designed to continuously monitor the behaviour of users, endpoint and networks for signs of unauthorized or anomalous activities. In order to do this, such solutions instrument the items they monitor and routinely upstream the result of such instrumentation to trusted backends where analysis and correlation happen.

A threat actor that faces such a defensive mechanism is confronted with the problem of hiding from the security control those same steps that are required to gain control of his target in the first place. Depending on the security solution and its configuration, the attacker can use a number of approaches to do this. Let's consider a situation where the attacker has compromised an endpoint that runs an EDR-like solution. One approach that he could take is to temporarily prevent connectivity to the EDR solution's backend, erase traces of the initial compromise, then quickly resume the network connectivity. In this way, the attacker has hidden his arrival on the system. This kind of behaviour is often combined with the elevation of privileges that allows for further avoidance of the EDR-like software.

In an embodiment of the invention, it is ensured that the initial compromise evidence, recorded by the EDR endpoint software, cannot be tampered with by attackers, that is, any tampering will be detected by the EDR backend. This is extremely important considering that initial compromise evidence is often the only trace of the attacker's activity.

In another use case example related to software updates authenticity verification, a malicious insider Eve received a legitimate certificate for signing software produced by her company ABC and wants to secretly install a backdoor into one customer endpoint. She prepares an update package containing the backdoor, signs it with her certificate, and sends it to the customer. When the package is verified in the endpoint, Eve cannot control the logging mechanism yet, so the verification operation details, including her certificate information, are logged locally. Logged details of verification operations are submitted to the backend of ABC (which is out of Eve's reach) once a day. When the package is installed and started, Eve has the control and the logged data of the package verification has not been sent to the backend yet. In an embodiment of the invention, it is ensured that unless Eve prevents any further sending of verification operation details to the backend, the unmodified details of the verification operation of her package will be received in the backend and can be used for discovering her malicious action.

Guaranteeing integrity of data collected in an endpoint in scenarios similar to the described above is difficult. Traditional cryptographic techniques, like digital signing, are not directly applicable as they require the signing key to be available at the endpoint. Clearly, an attacker who has gained access to the endpoint would have access to the signing key as well, making this approach useless. Instead, an embodiment of the present invention proposes a blockchain-based approach that involves operations both in the endpoint and in the backend and provides integrity to the data collected in the endpoint under realistic assumptions of the attacker's abilities.

Let us assume that we have a non-compromised endpoint, for example a freshly imaged laptop computer. On this machine, an EDR software in installed as a monitoring sensor. The sensor may run in the background and collect data about relevant activities in the endpoint. This data is locally stored, periodically retrieved, processed and sent upstream to a dedicated backend where it is analysed further.

Figure 2:
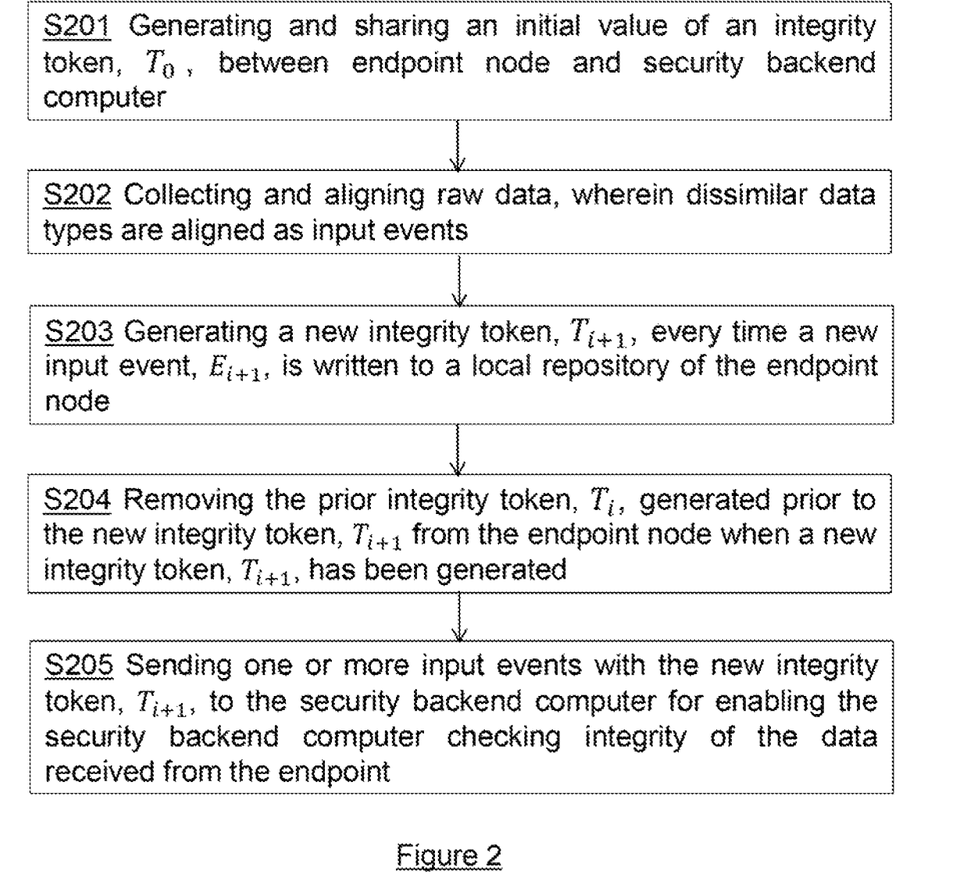
FIG. 2 is a flow diagram illustrating a method according to an embodiment.

To ensure the integrity of the data locally stored but not yet sent to the backend, a method according to an embodiment is illustrated by FIG. 2.

In S201, prior to any data collection done in the endpoint, an initial (genesis) value of an integrity token, $T_0$, is generated and shared between an endpoint node and a security backend computer. The generating of the initial value of the integrity token can be done either in the endpoint or in the backend computer and then be shared accordingly. It can be assumed that the endpoint is not compromised and thus, it is infeasible for the attacker to find the value of $T_0$, at least until a first event $E_1$ is written to a local repository of the endpoint node.

In S202, raw data is collected and aligned at the endpoint node, wherein dissimilar data types are aligned input events.

In S203, every time a new input event, $E_{i+1}$, is written to the local repository of the endpoint node, a new integrity token, $T_{i+1}$, is generated. The new integrity token, $T_{i+1}$, is computed based on the new input event, $E_{i+1}$, and a prior integrity token, $T_i$, that was generated prior to the new integrity token, $T_{i+1}$, as follows:

$T_{i+1}=H(E_{i+1} \text{ XOR } T_i)$, where H is a cryptographic hash function, e.g. SHA-512 or other recursive update formula. Alternatively, we can use $T_{i+1}=H(E_{i+1}\|T_i)$, or other appropriate recursive update formulae.

In S204, after the operation in S203, the prior integrity token, $T_i$, that was generated prior to the new integrity token, $T_{i+1}$, is removed from the endpoint node.

In S205, one or more input events are sent with the new integrity token, $T_{i+1}$, to the security backend computer for enabling the security backend computer checking integrity of the data received from the endpoint. At a submission time, the endpoint may send an ordered list of all the events that have not been submitted yet to the backend with the last generated integrity token. The security backend computer is enabled to check the integrity of the received data on the basis of a previously received integrity token related to the endpoint node, the new integrity token, $T_{i+1}$ and the received input events.

Figure 3:
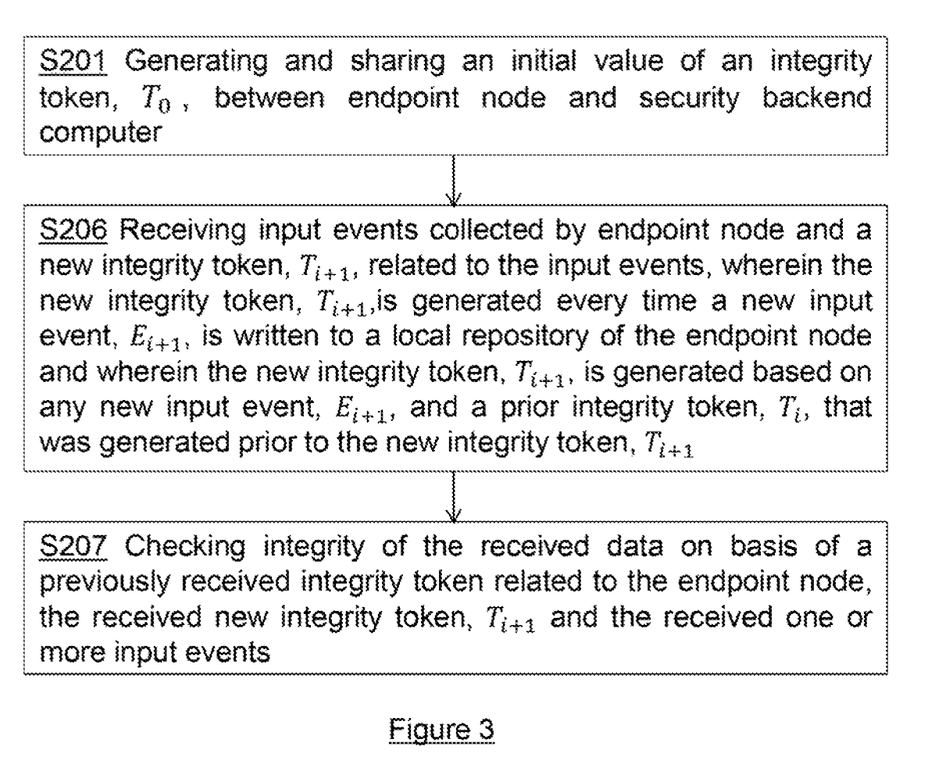
FIG. 3 is a flow diagram illustrating a method according to an embodiment.

FIG. 3 is another example of a method according to an embodiment.

In S201, same as in the example of FIG. 2, prior to any data collection done in the endpoint, an initial (genesis) value of an integrity token, $T_0$, is generated and shared between an endpoint node and a security backend computer.

In S206, the security backend computer receives one or more input events collected by the endpoint node and a new integrity token, $T_{i+1}$, related to the input events, wherein the new integrity token, $T_{i+1}$, is generated every time a new input event, $E_{i+1}$, is written to a local repository of the endpoint node and wherein the new integrity token, $T_{i+1}$, is generated based on any new input event, $E_{i+1}$, and a prior integrity token, $T_i$, that was generated prior to the new integrity token, $T_{i+1}$.

In S207, integrity of the received data is checked at the security backend computer on the basis of a previously received integrity token related to the endpoint node, the received new integrity token, $T_{i+1}$ and the received one or more input events. When the security backend computer receives a new submission from the endpoint, the previously submitted integrity token and the newly received events are used to reproduce the computations done by the endpoint between the previous and the current submissions. The final computed integrity token is compared with the new integrity token received from the endpoint. A mismatch between the two values will indicate tampering.

Thus, in an embodiment, a final computed integrity token is calculated on the basis of the received one or more input events and the previously received integrity token related to the endpoint node, and the final computed integrity token is compared with the new integrity token, $T_{i+1}$ received from the endpoint node. Further, it may be determined that the integrity of the received data has been compromised when it is detected that the final computed integrity token and the new integrity token, $T_{i+1}$, do not match on the basis of the comparison.

The new integrity token, $T_{i+1}$, is stored at the security backend computer for checking integrity of further data received from the endpoint when detecting that the final computed integrity token and the new integrity token, $T_{i+1}$, match on the basis of the comparison. That is, if the two values match, the security backend computer stores the new integrity token to use it for verification when the next submission from the endpoint arrives.

Let us assume that an integrity token, $T_j$, is computed based on a new event, $E_j$, and a token, $T_{j+1}$, and a prior token, $T_{j-1}$, is removed from the endpoint. When an attacker takes over the endpoint and wants to edit some of the recently collected events that can reveal the attack, modifying any event, $E_i$, in the local repository of the endpoint would result in a mismatching integrity token value and the attacker would not be able to compute $T_i$ and the subsequent integrity tokens, since $T_{i-1}$ is no longer available in the endpoint. For the same reason none of the stored events can be deleted as that would also result in a mismatch of the current integrity token, that is, would break the hash chain.

Figure 4:
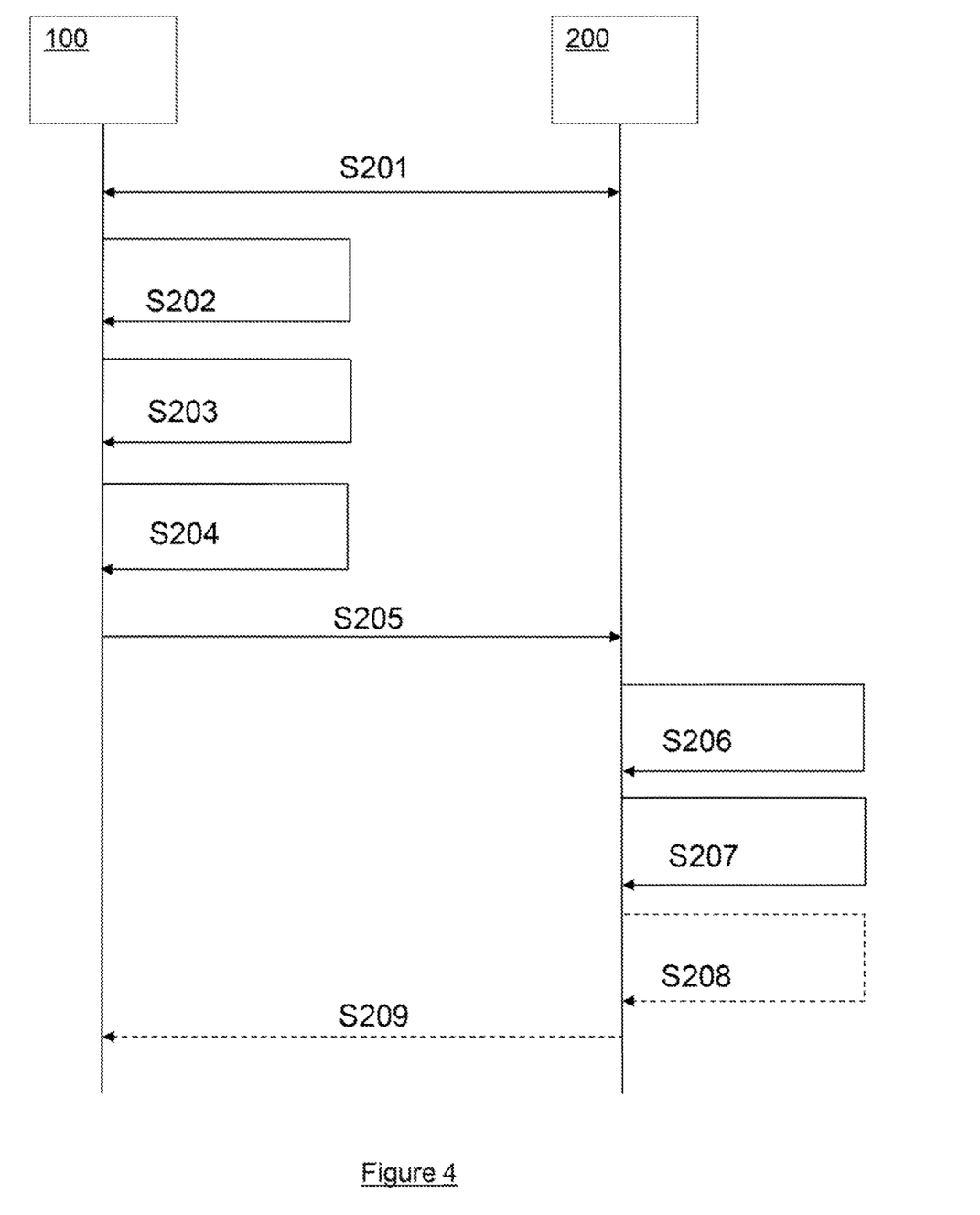
FIG. 4 is a signal sequence diagram illustrating an example of a data processing flow according to an embodiment.

FIG. 4 is a signal sequence diagram illustrating an example of a data processing flow according to an embodiment.

An endpoint node 100 and security backend computer 200 of a computer network both comprise one or more processors that are configured to protect integrity of data as follows:

In S201, an initial value of an integrity token, $T_0$, is generated and shared between the endpoint node 100 and the security backend computer 200.

In S202, endpoint node 100 collects data, wherein dissimilar data types are aligned as input events.

In S203, the endpoint node 100 generates a new integrity token, $T_{i+1}$, every time a new input event, $E_{i+1}$, is written to a local repository of the endpoint node, wherein the new integrity token, $T_{i+1}$, is generated based on the new input event, $E_{i+1}$, and a prior integrity token, $T_i$, that was generated prior to the new integrity token, $T_{i+1}$.

In S204, the endpoint node 100 removes the prior integrity token, $T_i$, generated prior to the new integrity token, $T_{i+1}$ from the endpoint node and this takes place each time a new integrity token, $T_{i+1}$, has been generated.

In S205, the endpoint node 100 transmits one or more input events with the new integrity token, $T_{i+1}$, to the security backend computer 200 for enabling the security backend computer checking integrity of the data received from the endpoint.

In S206, the security backend computer 200 receives one or more input events collected by the endpoint node and a new integrity token, $T_{i+1}$, related to the input events.

In S207, the security backend computer 200 checks integrity of the received data on the basis of a previously received integrity token related to the endpoint node, the received new integrity token, $T_{i+1}$ and the received one or more input events.

In S208, the security backend computer 200 stores the new integrity token, $T_{i+1}$, at the security backend computer for checking integrity of further data received from the endpoint when detecting that the final computed integrity token and the new integrity token, $T_{i+1}$, match on the basis of the comparison.

In S209, in case the integrity check establishes that the integrity of the received data has been compromised, further action is taken to secure the computer network and/or the endpoint node. The further action may comprise any one or more of: preventing the endpoint node from being switched off, switching on a firewall at the endpoint node, slowing down or blocking network connectivity of the endpoint node, removing or placing into quarantine suspicious files, collecting logs from the endpoint node, warning a user of the endpoint node that signs of a security breach have been detected, and/or sending a software update to the endpoint node.

For example, using the above described methods, data has been collected and sent from the nodes in the computer network 1 to the EDR backend 2. The analysis algorithm has determined that the integrity of any received data is detected to be compromised. As soon as the algorithm makes the determination, it may generate and issue a command to the related network nodes without human intervention to automatically initiate one or more of the above-described actions at the nodes. By doing this, a breach can be stopped and/or the damage minimised automatically at very high speeds and without human intervention.

It is envisaged that the action of automatically updating system software or sending software patches in response to detecting a sign of a breach will be particularly effective for corporate computer networks whose administrators apply updates and patches only in bulk at infrequent intervals. The method allows such administrators to continue their existing policies without disruption but gives the EDR system an autonomous, automatic override to apply updates and patches in emergency situations without human intervention. For example if a breach occurs at night and the administrator cannot be contacted, the EDR system automatically performs the necessary actions. By the time the administrator is contacted again, the computers on the network have been safely updated and the spread of the attack minimised.

The above-described methods contrast with existing security products (both EPPs and EDR systems) where most of the data collection, processing, and analysing procedures are manual such that it would not be possible to implement automatic response actions at equally high speeds and accuracy. This technical advantage is particularly realised over traditional systems which are based on human instinct and experience of security teams, intelligent guessing, and traditional statistics. Whilst such traditional systems are implemented using computers (given the nature of the technical field of the invention), they still ultimately rely on human decision making. As such, the present invention is more than merely automation of traditional techniques and it does not pre-empt the traditional, manual systems described above.

The present specification generally relates to distributed behavioural monitoring systems/scenarios in which data collectors ("sensors") may be provided on endpoints (and potentially elsewhere inside an organization). These sensors continuously collect, process and eventually upstream data to a centralized location (that can be locally deployed or hosted in a cloud), where this data is then analysed via a detection pipeline for security breaches, anomalies or other inconsistencies. The system environment in the embodiments of the invention may be closely related to and based on EDR systems and the sensor is such case is something that monitors the entity's activity by instrumenting a set of endpoints associated with the entity.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of protecting integrity of data in a computer network, the method comprising:
   generating and sharing an initial value of an integrity token, $T_0$, between an endpoint node and a security backend computer;
   collecting data at the endpoint node, wherein dissimilar data types are aligned as input events;
   generating a new integrity token, $T_{i+1}$, every time a new input event, $E_{i+1}$, is written to a local repository of the endpoint node, wherein the new integrity token, $T_{i+1}$, is generated based on the new input event, $E_{i+1}$, and a prior integrity token, $T_i$, that was generated prior to the new integrity token, $T_{i+1}$;
   removing the prior integrity token, $T_i$, generated prior to the new integrity token, $T_{i+1}$ from the endpoint node each time the new integrity token, $T_{i+1}$, has been generated; and
   sending one or more input events with the new integrity token, $T_{i+1}$, to the security backend computer for enabling the security backend computer checking integrity of the data received from the endpoint.

2. The method according to claim 1, wherein the new integrity token, $T_{i+1}$ is calculated by: $T_{i+1}=H(E_{i+1}$ XOR $T_i)$, where H is a cryptographic hash function or other recursive update formula.

3. The method according to claim 1, wherein the new integrity token, $T_{i+1}$ is calculated by: $T_{i+1}=H(E_{i+1}\|T_i)$, where H is a cryptographic hash function or other recursive update formula.

4. The method according to claim 1, wherein the sending of the one or more input events to the security backend computer further comprises the endpoint node sending an ordered list of all the input events that have not been submitted yet with the new integrity token, $T_{i+1}$.

5. The method according to claim 1, wherein the security backend computer is enabled to check the integrity of the received data on the basis of a previously received integrity token related to the endpoint node, the new integrity token, $T_{i+1}$ and the received input events.

6. The method according to claim 1, wherein the integrity check of the received data is based on calculating a final computed integrity token on the basis of the received input events and a previously received integrity token related to the endpoint node and comparing the final computed integrity token with the new integrity token, $T_{i+1}$ received from the endpoint node.

7. The method according to claim 6, the method further comprising determining that the integrity of the received data has been compromised when detecting that the final computed integrity token and the new integrity token, $T_{i+1}$, do not match on the basis of the comparison.

8. The method according to claim 6, the method further comprising storing the new integrity token, $T_{i+1}$, at the security backend computer for checking integrity of further data received from the endpoint when detecting that the final computed integrity token and the new integrity token, $T_{i+1}$, match on the basis of the comparison.

9. The method according to claim 1, comprising, if the integrity check established that the integrity of the received data has been compromised, taking further action to secure the computer network and/or the endpoint node, wherein the further action comprises one or more of the list of:
   preventing the endpoint node from being switched off;
   switching on a firewall at the endpoint node;
   slowing down or blocking network connectivity of the endpoint node;
   removing or placing into quarantine suspicious files;
   collecting logs from the endpoint node;
   warning a user of the endpoint node that signs of a security breach have been detected; and/or
   sending a software update to the endpoint node.

10. A method of protecting integrity of data in a computer network, the method comprising:
   generating and sharing an initial value of an integrity token, $T_0$, between an endpoint node and a security backend computer;
   receiving, by the security backend computer, one or more input events collected by the endpoint node and a new integrity token, $T_{i+1}$, related to the one or more input events, wherein the new integrity token, $T_{i+1}$, is generated every time a new input event, $E_{i+1}$, is written to a local repository of the endpoint node and wherein the new integrity token, $T_{i+1}$, is generated based on any new input event, $E_{i+1}$, and a prior integrity token, $T_i$, that was generated prior to the new integrity token, $T_{i+1}$; and
   checking integrity of the received data on the basis of a previously received integrity token related to the endpoint node, the received new integrity token, $T_{i+1}$ and the received one or more input events.

11. The method according to claim 10, wherein the integrity check of the received data further comprises:
    calculating a final computed integrity token on the basis of the received one or more input events and the previously received integrity token related to the endpoint node; and
    comparing the final computed integrity token with the new integrity token, $T_{i+1}$ received from the endpoint node.

12. The method according to claim 11, the method further comprising determining that the integrity of the received data has been compromised when detecting that the final computed integrity token and the new integrity token, $T_{i+1}$, do not match on the basis of the comparison.

13. The method according to claim 11, the method further comprising storing the new integrity token, $T_{i+1}$, at the security backend computer for checking integrity of further data received from the endpoint when detecting that the final computed integrity token and the new integrity token, $T_{i+1}$, match on the basis of the comparison.

14. The method according to claim 10, comprising, if the integrity check established that the integrity of the received data has been compromised, taking further action to secure the computer network and/or the endpoint node, wherein the further action comprises one or more of the list of:
    preventing the endpoint node from being switched off;
    switching on a firewall at the endpoint node;
    slowing down or blocking network connectivity of the endpoint node;
    removing or placing into quarantine suspicious files;
    collecting logs from the endpoint node;
    warning a user of the endpoint node that signs of a security breach have been detected; and/or
    sending a software update to the endpoint node.

15. An endpoint node of a computer network, comprising:
    one or more processors configured to:
        generate and share an initial value of an integrity token, $T_0$, between an endpoint node and the security backend computer;
        collect data at the endpoint node, wherein dissimilar data types are aligned as input events;
        generate a new integrity token, $T_{i+1}$, every time a new input event, $E_{i+1}$, is written to a local repository of the endpoint node, wherein the new integrity token, $T_{i+1}$, is generated based on the new input event, $E_{i+1}$, and a prior integrity token, $T_i$, that was generated prior to the new integrity token, $T_{i+1}$;
        remove the prior integrity token, $T_i$, generated prior to the new integrity token, $T_{i+1}$ from the endpoint node each time the new integrity token, $T_{i+1}$, has been generated; and
        send one or more input events with the new integrity token, $T_{i+1}$, to the security backend computer for enabling the security backend computer checking integrity of the data received from the endpoint.

16. A security backend computer of a computer network, comprising:
    one or more processors configured to:
        generate and share an initial value of an integrity token, $T_0$, between an endpoint node and the security backend computer;
        receive, by the security backend computer, one or more input events collected by the endpoint node and a new integrity token, $T_{i+1}$, related to the one or more input events, wherein the new integrity token, $T_{i+1}$, is generated every time a new input event, $E_{i+1}$, is written to a local repository of the endpoint node and wherein the new integrity token, $T_{i+1}$, is generated based on any new input event, $E_{i+1}$, and a prior integrity token, $T_i$, that was generated prior to the new integrity token, $T_{i+1}$; and
        check integrity of received data on the basis of a previously received integrity token related to the endpoint node, the received new integrity token, $T_{i+1}$ and the received one or more input events.

17. A non-transitory computer-readable medium comprising computer readable code that, when executed by a computer system or server, causes the computer system or the server to perform the method of claim 1 or 10.

* * * * *